Figure 1:
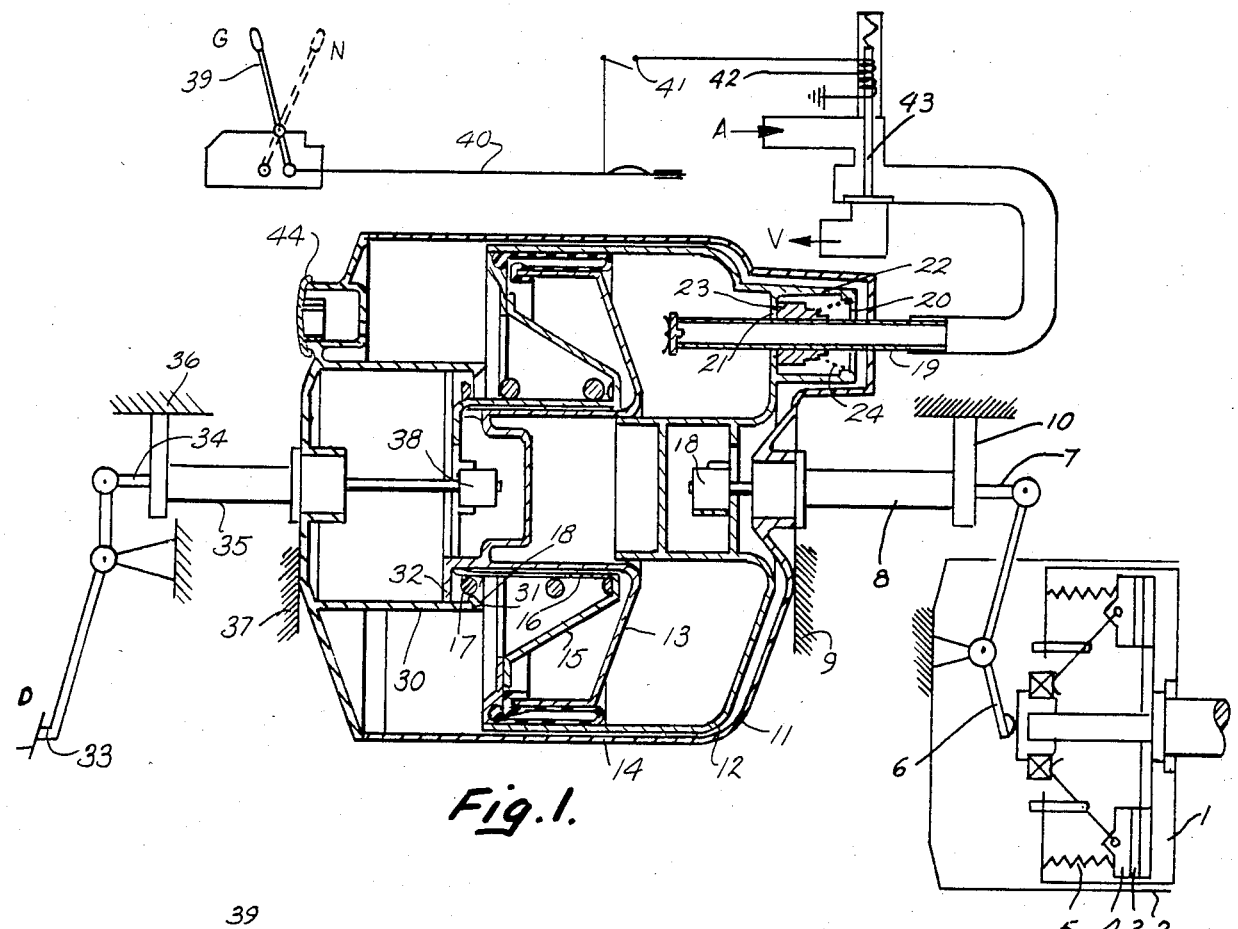

United States Patent [19]

Cruijsen

[11] Patent Number: 4,603,765
[45] Date of Patent: Aug. 5, 1986

[54] MEANS FOR MAINTAINING CLUTCH DISENGAGEMENT WHERE TRANSMISSION IS NEUTRAL

[75] Inventor: Hermanus G. M. Cruijsen, Mierlo, Netherlands

[73] Assignee: Volvo Car B.V., Netherlands

[21] Appl. No.: 627,074

[22] Filed: Jul. 2, 1984

[51] Int. Cl.⁴ .................. B60K 41/22; F16D 25/00
[52] U.S. Cl. .......................... 192/85 V; 192/3.59; 192/99 S
[58] Field of Search .............. 192/3.58, 3.59, 99 S, 192/98, 101, 70.28, 83, 90, 91 R, 0.08, 0.092, 85 V; 91/217, 211, 374, 376 R

[56] References Cited

U.S. PATENT DOCUMENTS

| 2,631,700 | 3/1953 | Long et al. ............... | 192/3.59 X |
| 3,204,730 | 9/1965 | Alfieri et al. ............. | 192/0.08 |
| 3,327,817 | 6/1967 | Ivanchich .................. | 192/0.08 X |
| 3,841,449 | 10/1974 | Coffey et al. ............. | 192/3.59 |

Primary Examiner—George H. Krizmanich
Attorney, Agent, or Firm—Price, Heneveld, Huizenga & Cooper

[57] ABSTRACT

A mechanically operable clutch having a foot pedal used in connection with a transmission operated by a lever is arranged with an operating assembly physically connecting the clutch pedal to the clutch. The operating assembly includes a pair of pistons, one within the other having a lost motion connection including a compression spring between them. The inner piston being connected to the pedal and the outer piston to the clutch. The pistons form a chamber between them normally open to the atmosphere. A source of vacuum and a valve controlled by the transmission lever and operable when said lever is moved to place the transmission in neutral to connect the chamber to the vacuum source and thereby shift the pistons in such a way as to hold the clutch disengaged and the pedal erected so long as the transmission remains in neutral.

7 Claims, 5 Drawing Figures

MEANS FOR MAINTAINING CLUTCH DISENGAGEMENT WHERE TRANSMISSION IS NEUTRAL

The present invention relates to the disengaging means for a motor vehicle which comprises a foot-operated clutch and a manually operated gear box.

It is known to operate the clutch between the fly wheel of the engine and the gear box in motorcars by means of a foot-pedal which is directly connected with the clutch and which is adapted to disengage the clutch discs against the spring action of the clutch springs. It is also known to support such a mechanical system by means of a hydraulic or pneumatic auxiliary device.

In motor cars it is important to keep the power consumption as low as possible, with conservation of the performances. This can be achieved i.a. by reducing the stationary number of revolutions. However, owing to a lower number of revolutions the non-uniformity of the crank shaft of the engine is increased, whereby unacceptable clattering and rattling noises appear in the gear box and the driving line when the clutch is not disengaged.

The present invention tends to give a solution to this problem. For that purpose a structure has been invented in which the clutch of a motor vehicle, with running engine, after the clutch pedal has been depressed and the gear box has been put into its neutral position, remains disengaged when the clutch pedal is released thereafter. The oscillations caused by the non-uniformity of the engine cannot be transmitted to the driving line, so that the clattering and rattling noises, which are very inconvenient for the passengers, will no longer appear. The European patent application No. 81201404.1 describes a disengaging gear with the abovementioned aim for a hydraulically operated clutch.

It appears that for a motor vehicle having a mechanically operated clutch a vacuum control means can be successfully applied for achieving the purpose aimed at, in which the vacuum of the engine is used in petrol engines or the vacuum pump in diesel engines.

The vacuum control means may comprise:

a vacuum cylinder with integral control valve housing, the vacuum of which is controlled by a control device which is provided between the control valve housing and the gear lever, said vacuum cylinder being coupled to the clutch by means of a pull cable;

a piston which is reciprocable in the cylinder and about which a spring dish is reciprocable, which is coupled to a clutch pedal by means of a pull cable;

a resilient member cooperating with the spring dish;

a tube which forms the end of the vacuum line and which is rigidly connected with the housing, said tube protruding through the control valve housing and at its end having radial apertures and axial apertures, which are covered by a rubber closing plate and which are incorporated in a cover plate having a diameter which is slightly larger with respect to the tube, and a spring-loaded valve mounted within the control valve housing around the tube, said valve controlling the vacuum between piston and cylinder.

However, the fact that the clutch remains disengaged, as described above, would also imply that then the clutch pedal is still hanging loose, i.e. it does not return, as in the known disengaging means, into its original position, under the influence of the springs in the clutch.

However, the driver is used, when he wants to start the vehicle again, to depressed the clutch pedal against the said spring action. In order to stimulate this in the device according to the invention the vacuum control device is carried out in such a way that owing to the vacuum force and owing to an additional spring force the clutch pedal yet returns into its original position. These forces are almost equal to the force of the springs in the clutch.

In the disengaging means according to the invention the vacuum control system is provided between the clutch and the clutch pedal.

Figure 3:
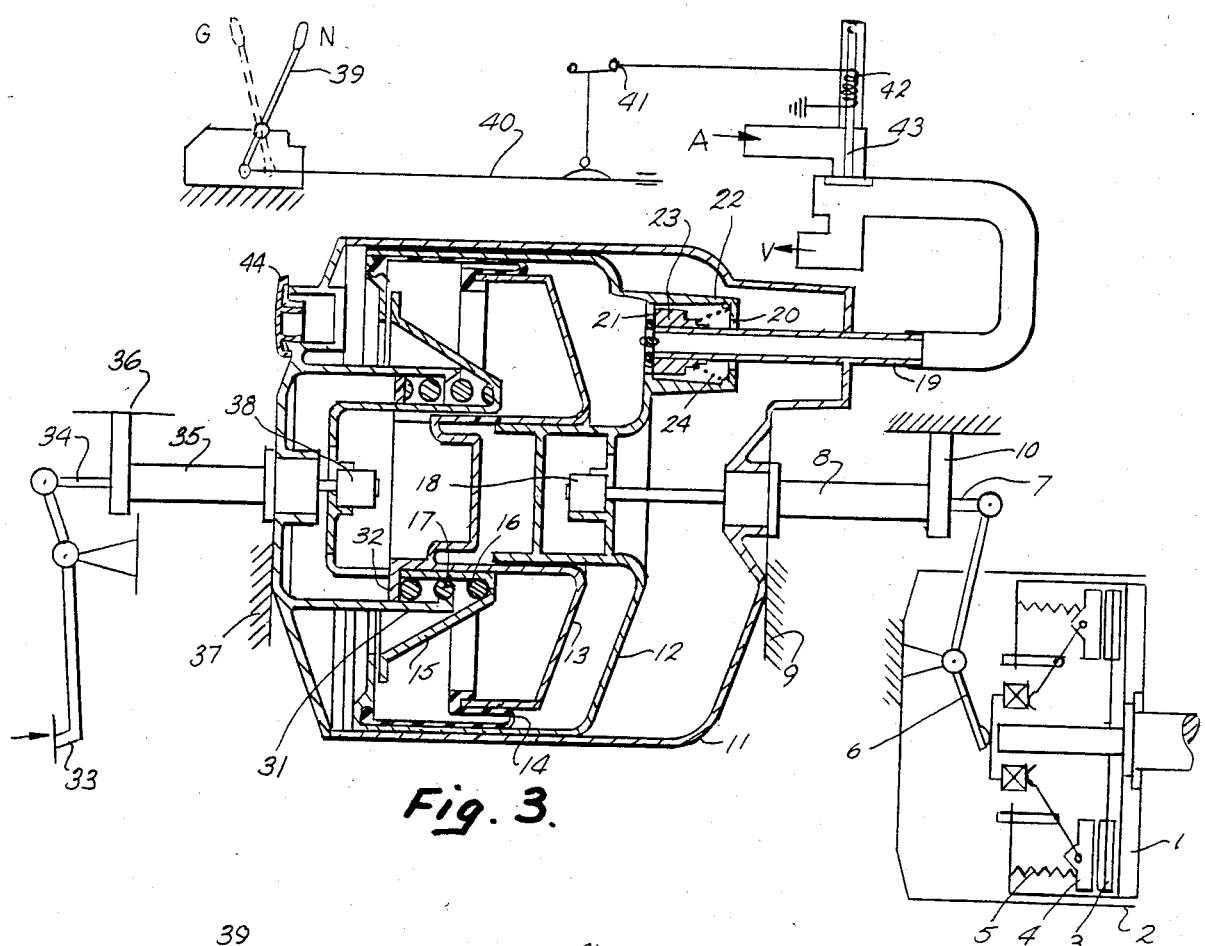
Figure 4:
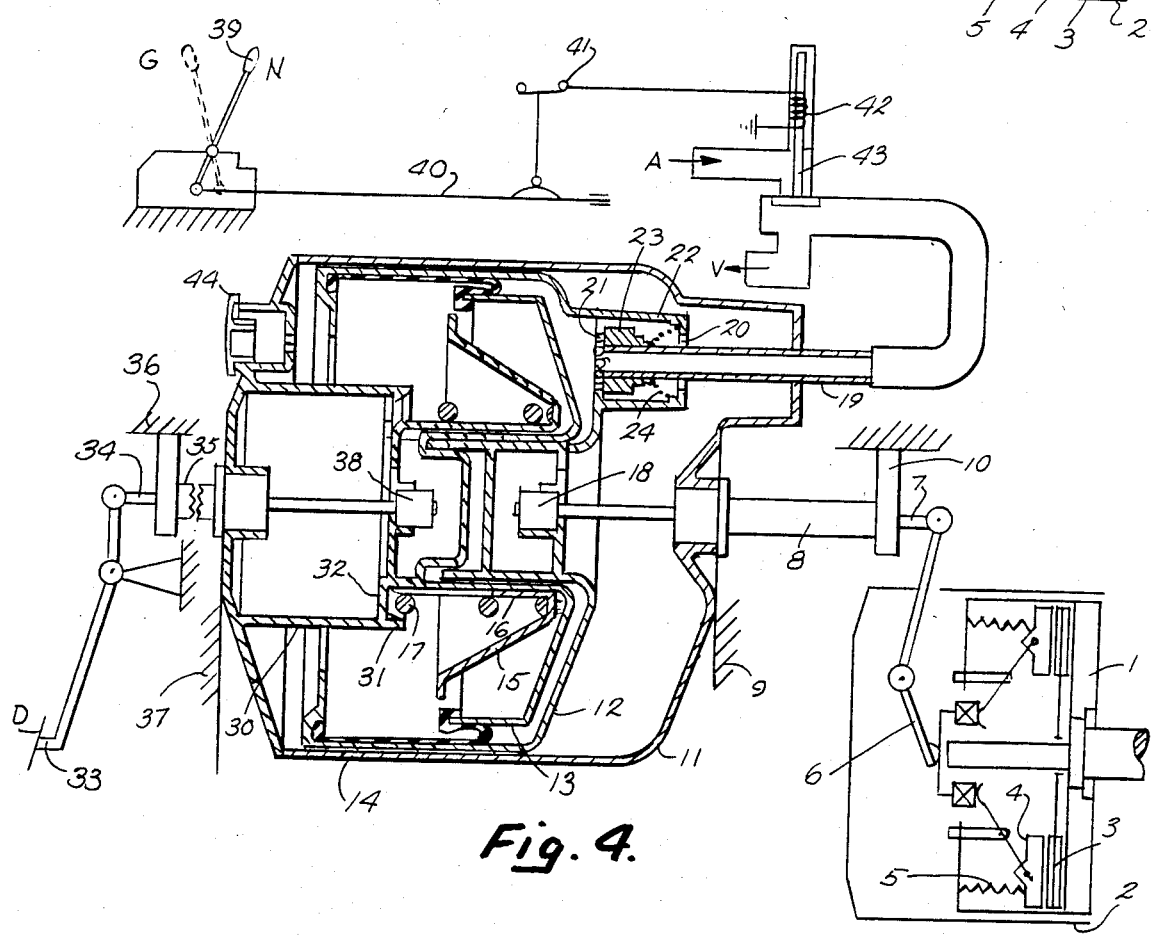
Figure 5:
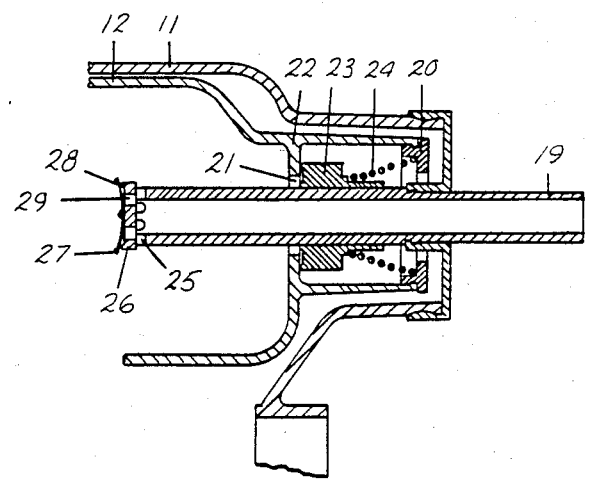

The invention will be further elucidated herebelow from the drawing, in which by way of example an embodiment of the means according to the invention is represented. In the drawing:

the FIGS. 1-4 show diagrams of the disengaging means in the normal driving position, with treaded clutch pedal, with gear lever in neutral position and with released clutch pedal, and FIG. 5 shows in an enlarged scale the section of the vacuum control means.

The disengaging means belongs to a fly wheel 1 of the engine and a clutch housing 2 within which is the clutch comprising a clutch disc 3, a pressure group 4 and clutch springs 5. The pressure group 4 is connected by means of a lever 6 with a pull cable 7 which extends through the rope mantle 8 locked in between the fixed points 9 and 10.

The vacuum control means comprises a housing 11 in which a cylinder 12 comprising a piston 13 is mounted. Between the cylinder 12 and the piston 13 a membrane 14 is provided. The piston 13 is formed in such a way that it is capable of receiving a spring dish 15. A spiral spring 17 is mounted about the central box-like part 16 of the spring dish 15.

The pull cable 7 is coupled to the cylinder 12 through an aperture in the housing 11 at 18. In the housing 11, moreover, a tube 19 is provided which is inserted into the cylinder 12 through the apertures 20 and 21. The apertures 20 and 21 are provided in the control valve housing 22 which is integrated with the cylinder 12. In the control valve housing 22 a control valve is mounted comprising a valve 23 and a valve spring 24. The valve 23 which is adapted to close the apertures 21 is slidably mounted onto the tube 19. The tube 19 is provided with radial apertures 25 at the end located in the vacuum room of cylinder 12. This is represented more clearly in FIG. 5. The tube 19 is closed at the end by a cover plate 26 onto which a closing plate 27 is mounted. The cover plate 26 comprises a protruding edge 28 and is provided with axial apertures. The housing 11 is integrated with a cylindrical box 30 provided with a stop edge 31. This stop edge 31 limits the stroke of the piston 13 when the latter is moved to the right in that then the flange 32 of the piston 13 contacts the edge 31.

In the FIGS 1-4 furthermore the clutch pedal is indicated by 33. Said pedal is coupled to the spring dish 15 through a pull cable 34 extending through the rope mantle 35, which is locked in between the fixed points 36 and 37. For that purpose the pull cable 34 at its end is provided with a thickening 38 fixed in the spring dish 15. The gear lever is indicated by 39 and said lever may be in the neutral position N or in a switched position G. A rod 40 is mounted to the gear lever 39 and operates a switch 41 which is incorporated in an electric circuit.

This circuit further comprises a solenoid 42 provided about the stem of a valve 43. The valve 43 is adapted to admit either the atmosphere into the tube 19 at A or vacuum of the engine or a pump at V.

In the housing 11 furthermore an air supply aperture is provided, indicated by 44.

In FIGS. 1 through 4 successively the situations are given which are created when a running motor vehicle is stopped and is started again directly thereafter, so that the engine keeps on running stationarily.

Figure 2:
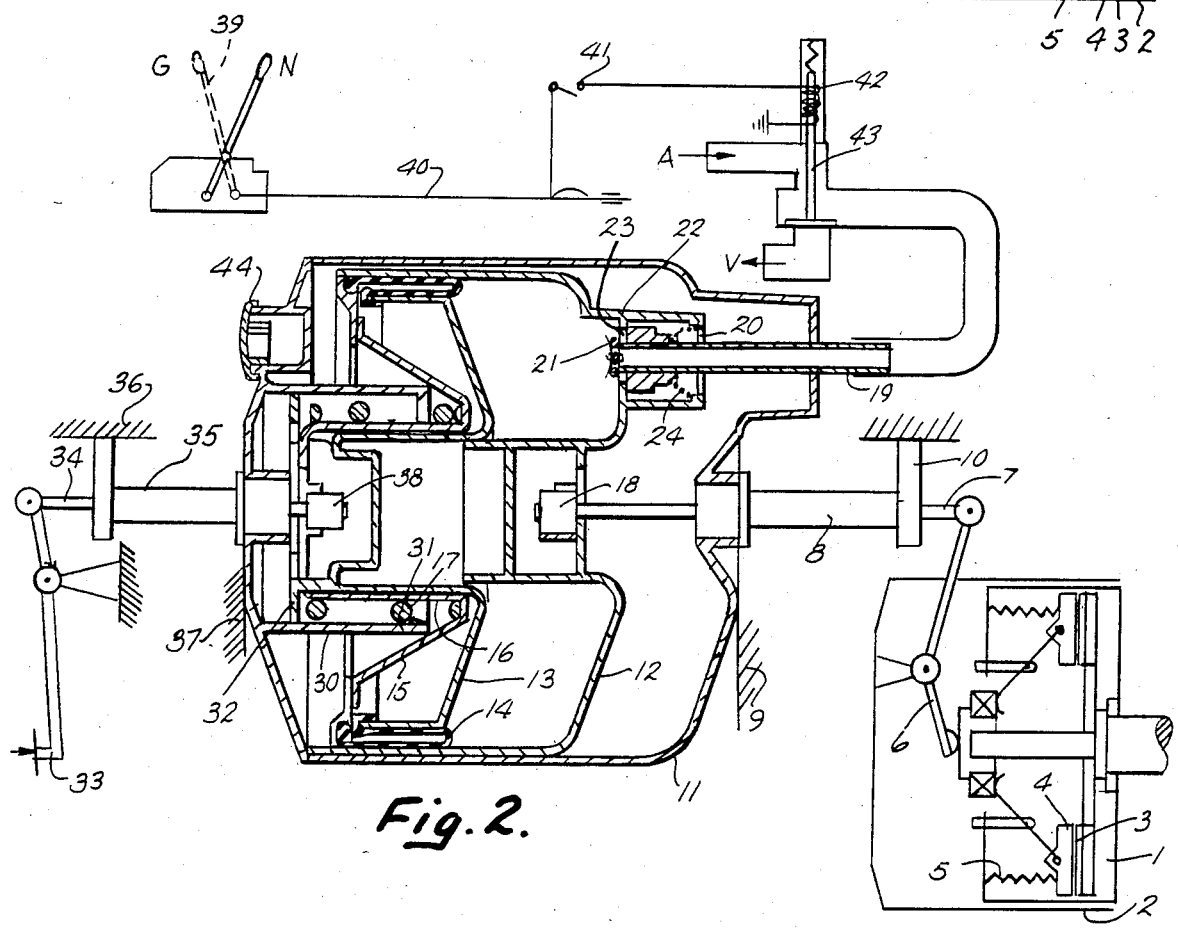

FIG. 1 represents the normal driving situation. The clutch pedal 33 is in position D, i.e. that the clutch is not depressed. The gear lever 39 is in a switched position G. The vacuum room of the cylinder 12 is connected at A through tube 19 with the atmosphere through the apertures 25 which have not been closed by the valve 23, 24 since the clutch springs 5 keep the cylinder fully to the right by means of lever 6 and pull cable 7. If it is desired to stop the vehicle from this position, firstly the clutch 33 is depressed. The situation which is created then is indicated in FIG. 2. By means of the pull cable 34 which is fixedly connected with the spring dish 15 with its thickened end 38, the spring dish 15, the pistion 13, the cylinder 12 and the spring 17 are moved to the left. Therewith also the control valve housing 21 is moved to the left, and valve 23 is shifted to the left along tube 19. The radial apertures 25 are not yet closed now by the valve 23. When the gear lever 39 is put into the neutral position, indicated by character N, the situation which is represented in FIG. 3 is created. Then by means of the switch 41 the electric circuit is closed, whereby the solenoid 42 is excited.

The valve 43 cuts off the supply of atmosphere at A and opens the passage to engine vacuum or vacuum pump at V. Vacuum suction takes place now in the room between cylinder 12 and piston 13. The piston 13 is moved to the right whereby spring 17 is compressed until the force in the spring 17 is equal to the force in the pull cable 7, which is drawn by the clutch springs 5. Additional vacuum suction when this stage is reached, moves cylinder 12 slightly to the left under the influence of the vacuum force and at the same time piston 13 is moved to the right. Owing to the slight movement to the left of the cylinder 12 the radial apertures 25 are closed now by the valve 23. This is possible in that the aperture 21 is large enough to make the cover plate 26 pass through. The movement to the right of piston 13 is effected by the force equilibrium between the spring force of spring 17 and the pull force in pull cable 7 and the vacuum force in the vacuum room. This situation of equilibrium is represented in FIG. 3.

When the clutch pedal is released the situation as represented in FIG. 4 is created.

Under the influence of the still exists vacuum force and the releasing force of spring 17 piston 13 is moved to the right until flange 32 abuts against stop 31. Owing to this movement the space occupied by the vacuum becomes smaller, hence the subatmospheric pressure is reduced and as a result cylinder 12 is moved to the right.

This results in that valve 23 is also moved to the right, whereby the radial apertures 25 are cleared. Then there is vacuum suction again in the vacuum room, whereby cylinder 12 is moved to the left and the apertures 25 are closed again. Owing to the action of valve 23 in this way the subatmospheric pressure in the vaccum room is regulated in such a way that the vacuum force remain in equilibrium with the force in pull cable 7. The release of spring 17 moves spring dish 15 to the right whereby the clutch pedal comes into the position D.

Now the situation is created which is the object of the present invention, viz. that during stationarily running of the engine the clutch remains disengaged when the gear lever is in neutral position and the clutch pedal is not depressed. When driving from this stage the driver depresses the clutch pedal again. He feels a counter pressure from the clutch pedal caused by the spring 17 and the vacuum, in spite of th fact that the clutch itself is disengaged.

As a result of depressing the clutch pedal the spring 17 is compressed until the spring force is equal to the vacuum force onto the piston 13. Upon further depressing the clutch pedal piston 13 is moved to the left whereby due to the existing subatmospheric pressure in the vacuum chamber is increased, owing to which cylinder 12 is moved to the left. Said displacement of cylinder 12 also moves valve housing 22 to the left and away from the valve 23 which is closed by the cover plate 26, so that this valve does not close the aperture 21 any more. The atmospheric air may enter then into the vacuum chamber through air supply aperture 44 and the apertures 20 and 21. Thereby the subatmospheric pressure in the vacuum room is reduced, owing to which cylinder 12 is moved to the right until the valve 23 closes the aperture 21 again.

Now the subatmospheric pressure in the vacuum room is in equilibrium again with the force in pull cable 7 whereby the clutch remains disengaged. This is the situation of FIG. 3. When, at this very moment, the gear lever is put into a switching position, the contact is interrupted at 41. The valve 43 then cuts off the vacuum at V and the passage to the atmosphere at A is opened. Ambient air is flowing then through tube 19 and through the axial apertures 29 into the vacuum chamber by pushing away the closing plate 27 from the cover plate 26. For that purpose the rubber closing plate 27 is released from the cover plate 26 to clear the aperture 29. Then the situation of FIG. 2 is created again. When the clutch pedal is released now, the situation of FIG. 1 is created again.

From the foregoing it appears that the control mechanism 22, 23, 24, 25, 26, 17, 28 and 29 always effects an equilibrium between the vacuum force in cylinder 12 and the pull force in pull cable 7.

Also alterations in the force distribution as a result of wearing of the clutch are compensated by this control mechanism. This means that alterations in the clutch force appearing in disengaging means as a result of wearing of the clutch plates are automatically adjusted by application of the present invention.

I claim:

1. In a vehicle having a transmission, a transmission control lever and a mechanical clutch with a manually operable foot control pedal, means for maintaining the vehicle's clutch disengaged while the vehicle is stationary and the transmission is in neutral, said means comprising: a pair of cylinders mounted for reciprocation within said housing; one of said cylinders being mounted within the other and forming a chamber between them; first linkage means connecting said pair of cylinders to said clutch whereby the spring of the clutch holds both of said cylinders toward one end of said housing when the clutch is engaged and said transmission is in gear; second linkage means connecting said clutch pedal to said cylinders; a valve element connected to the transmission control lever; said valve element connecting said chamber to a source of vacuum only when said lever is shifted to place the transmission in neutral; a compression spring interconnecting said second linkage means and the inner one of said cylinders and urging said inner cylinder toward the other end of said housing and said clutch pedal into erected position and expanding said chamber when said clutch is engaged; said inner cylinder being vacuum shifted toward said other end of said housing and compressing said spring to erect said clutch pedal, the vacuum holding the cylinder toward said other end and said clutch disengaged so long as said transmission control lever remains in neutral position.

2. In a vehicle having a transmission, a transmission control lever and a mechanical clutch with a manually operable foot control pedal, means for maintaining the vehicle's clutch disengaged while the vehicle is stationary and the transmission is in neutral, said means comprising: a pair of pistons mounted within said housing and one within the other for reciprocation both within said housing and with respect to each other said pistons forming a chamber between them; first linkage means connecting the outer one of said pistons to said clutch whereby the spring of the clutch holds both of said pistons toward one end of said housing when the clutch is engaged and said chamber is connected to the atmosphere; second linkage means connecting said clutch pedal to the inner one of said pistons for holding said clutch pedal erect when said clutch is engaged; a lost motion connection between said pistons permitting relative reciprocal movement between them, said lost motion connection including a compression spring; a valve element connected to the transmission control lever; said valve element connecting said chamber to a source of vacuum only when said lever is shifted to place the transmission in neutral; said compression spring urging said clutch pedal into erected position and expanding said chamber when said clutch is engaged; said inner piston when said chamber is subject to vacuum, being shifted toward said other end of said housing and compressing said spring whereby said spring erects said clutch pedal, the vacuum holding the outer piston toward said other end and said clutch disengaged against the bias of the clutch's springs so long as said transmission control lever remains in neutral position.

3. The means for maintaining a vehicle's clutch disengaged as described in claim 2 wherein the surfaces of both of said pistons directed toward said other end are exposed to atmospheric pressure at all times.

4. The means for maintaining a vehicle's clutch disengaged as described in claim 2 wherein said valve element is connected to said chamber by a conduit; a valve means formed by said outer piston and said conduit at the point of communication between the conduit and the chamber; said valve means including a port at the end of said conduit and port closure means on the wall of said chamber for opening and closing said conduit in response to the position of said outer piston while said valve element connects said conduit to the vacuum source.

5. The means for maintaining a vehicle's clutch disengaged as described in claim 2 wherein said valve element is connected to said chamber by a conduit; valve means at the end of said conduit communicating with said chamber; closure means on said outer piston cooperating with said valve means for opening and closing said valve means in response to the position of said outer piston for maintaining a balance of the counteracting forces generated by the vacuum and the clutch springs.

6. The means for maintaining a vehicle's clutch disengaged according to claim 1, further characterized in that in the disengaged position the force exerted by the spring and the force exerted by the vacuum together are almost equal to the force which would be exerted by the clutch springs when the clutch is not engaged.

7. In a vehicle having a transmission, a transmission control lever and a mechanical clutch with a manually operable foot pedal, means for maintaining the vehicle's clutch disengaged while the vehicle is stationary and the transmission is in neutral, said means being between said clutch and foot pedal and operatively connected to both and including a pair of pistons telescopically positioned one within the other, a lost motion connection between said pistons permitting limited reciprocal movement, relative to each other, said lost motion connection including a spring urging one of said pistons toward one end of the other piston, said pistons forming a chamber between them; both ends of said outer piston and one end of said inner piston being subject to atmospheric pressure at all times; a valve element connected to the transmission control lever; said valve element connecting said chamber to a source of vacuum only when said lever is shifted to place the transmission in neutral; said compression spring urging said clutch pedal into erected position and expanding said chamber when said clutch is engaged; said inner piston when said chamber is subject to vacuum, being shifted toward said other end of said outer piston and compressing said spring whereby said spring erects said clutch pedal, the vacuum holding the outer piston toward said other end and said clutch disengaged against the bias of the clutch's springs so long as said transmission control lever remains in neutral position.

* * * * *